(12) United States Patent  
Tsuruta et al.

(10) Patent No.: US 10,722,965 B2  
(45) Date of Patent: Jul. 28, 2020

(54) SOLDER BALL SUPPLYING METHOD, SOLDER BALL SUPPLYING DEVICE, AND SOLDER BUMP FORMING METHOD

(71) Applicant: Senju Metal Industry Co., Ltd., Tokyo (JP)

(72) Inventors: Kaichi Tsuruta, Tochigi (JP); Takeo Saito, Tochigi (JP); Manabu Muraoka, Tochigi (JP); Hiroki Oshima, High Wycombe (GB)

(73) Assignee: Senju Metal Industry Co., Ltd., Tokyo (JP)

( * ) Notice: Subject to any disclaimer, the term of this patent is extended or adjusted under 35 U.S.C. 154(b) by 970 days.

(21) Appl. No.: 14/392,168

(22) PCT Filed: Jun. 26, 2013

(86) PCT No.: PCT/JP2013/067504  
§ 371 (c)(1),  
(2) Date: May 23, 2016

(87) PCT Pub. No.: WO2014/207835  
PCT Pub. Date: Dec. 31, 2014

(65) Prior Publication Data  
US 2016/0271715 A1    Sep. 22, 2016

(51) Int. Cl.  
*B23K 3/06* (2006.01)  
*B23K 1/00* (2006.01)

(52) U.S. Cl.  
CPC .............. *B23K 3/0623* (2013.01); *B23K 1/00* (2013.01)

(58) Field of Classification Search  
CPC .................................................. B23K 3/0623  
USPC ............ 228/180.22, 245–246; 257/737–738; 438/613–616  
See application file for complete search history.

(56) References Cited

U.S. PATENT DOCUMENTS

| | | | |
|---|---|---|---|
| 6,253,985 B1 * | 7/2001 | Kajii | B23K 3/0623 228/1.1 |
| 6,293,456 B1 * | 9/2001 | MacKay | B23K 3/0623 228/254 |
| 6,919,634 B2 * | 7/2005 | Kuramoto | H01L 21/4853 257/738 |

(Continued)

FOREIGN PATENT DOCUMENTS

| JP | 8153960 A | 11/1996 |
|---|---|---|
| JP | 2007125578 A | 5/2007 |

(Continued)

*Primary Examiner* — Ibrahime A Abraham  
*Assistant Examiner* — John J Norton  
(74) *Attorney, Agent, or Firm* — The Webb Law Firm

(57) ABSTRACT

A solder-ball-supplying method, a solder-ball-supplying device and a solder-bump-forming method, which are flux-less and capable of being also applied to electrodes having a fine pitch. A substrate on which a resist with openings is positioned on electrode(s), which has a diameter of 10 through 30 μm, of the substrate is prepared. Next, plural solder balls SBL each having a grain diameter of 1 through 10 μm are shaken down to the opening(s) of the resist from a hopper and filled therein. Next, by sliding and moving a squeegee on an upper surface of the resist along X-Y direction, the solder balls SBL shaken down to the resist other than the openings are scrapped and removed and the solder balls SBL in the openings and around them are pushed into the openings by the squeegee.

9 Claims, 5 Drawing Sheets

(56) References Cited

U.S. PATENT DOCUMENTS

| | | | |
|---|---|---|---|
| 8,302,838 B2* | 11/2012 | Mukai | H01L 24/11 228/245 |
| 2003/0162379 A1* | 8/2003 | Tong | H01L 24/11 438/613 |
| 2003/0166331 A1* | 9/2003 | Tong | H01L 24/11 438/613 |
| 2004/0089697 A1* | 5/2004 | Isa | B23K 3/0623 228/41 |
| 2004/0178251 A1* | 9/2004 | Trucco | H05K 3/3484 228/248.1 |
| 2007/0099411 A1 | 5/2007 | Matsui et al. | |
| 2007/0130764 A1 | 6/2007 | Nebashi et al. | |
| 2008/0050209 A1* | 2/2008 | Mizuno | B23K 3/0623 414/217 |
| 2008/0213613 A1* | 9/2008 | Kuramoto | B23K 3/0623 428/577 |
| 2008/0296355 A1* | 12/2008 | Costales | B23K 3/0623 228/246 |
| 2009/0087948 A1 | 4/2009 | Lange et al. | |
| 2009/0087984 A1* | 4/2009 | Akutagawa | H01L 24/11 438/658 |
| 2011/0284618 A1 | 11/2011 | Mukai et al. | |
| 2011/0297433 A1* | 12/2011 | Kuramoto | B23K 1/0016 174/263 |
| 2013/0181041 A1* | 7/2013 | Sakurai | B23K 1/0016 228/245 |

FOREIGN PATENT DOCUMENTS

| | | |
|---|---|---|
| JP | 2009081398 A | 4/2009 |
| JP | 4458835 B2 | 4/2010 |
| JP | 2010004060 A | 7/2010 |
| JP | 2011249409 A | 8/2011 |
| WO | 2006004000 A1 | 1/2006 |

* cited by examiner

[FIG. 1]
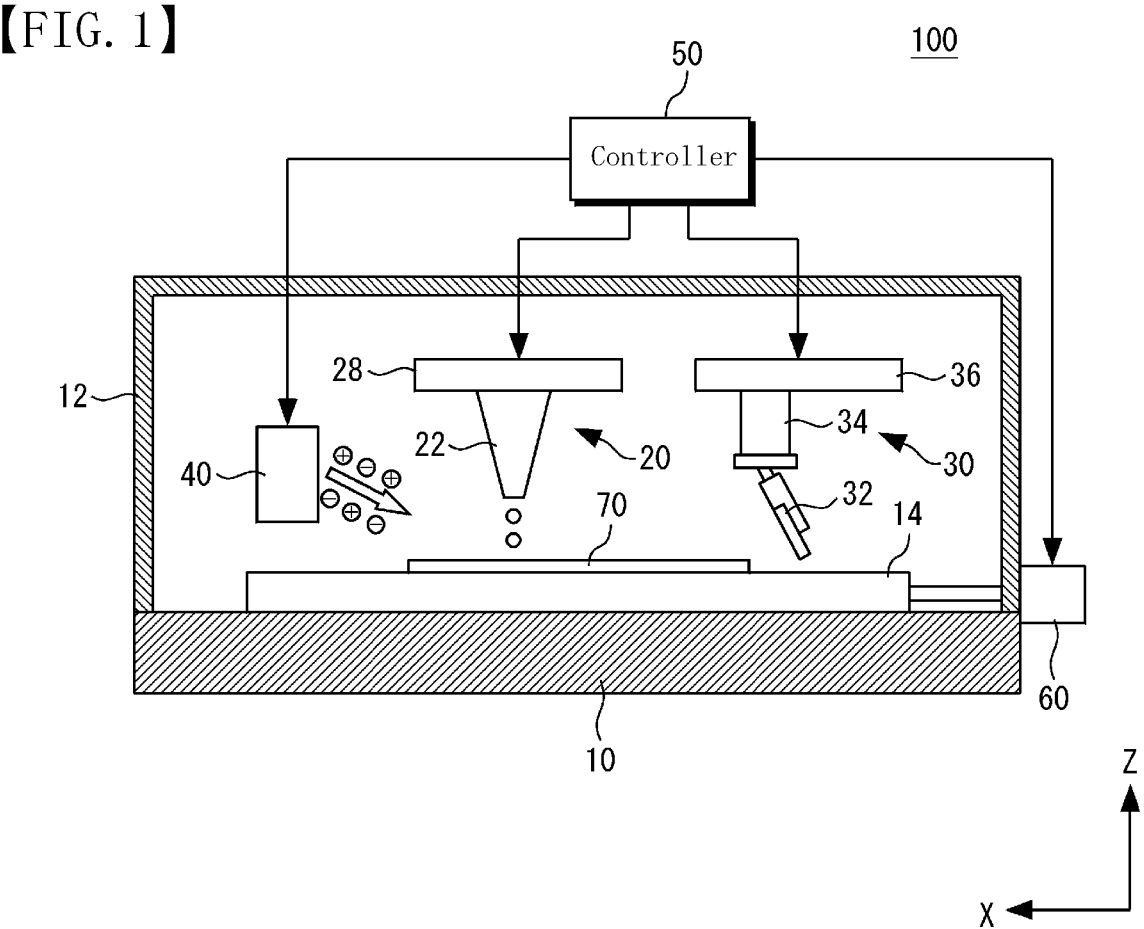
[FIG. 2]
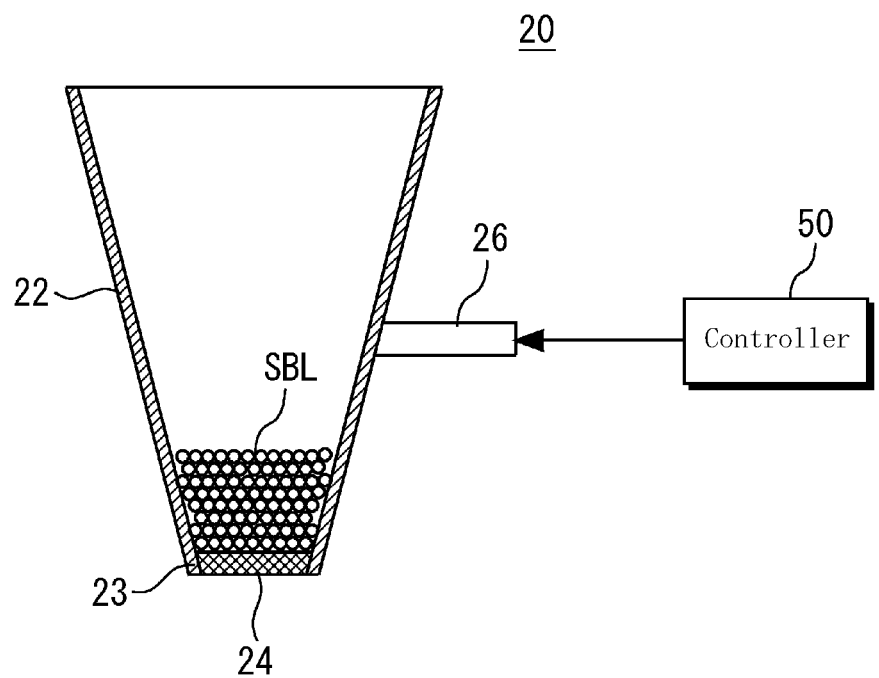

[FIG. 3A]
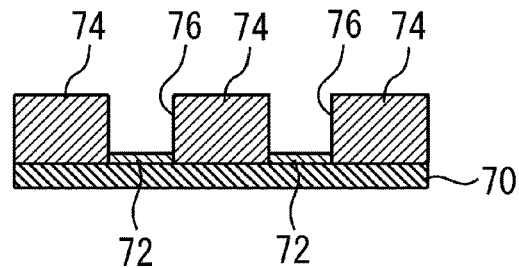
[FIG. 3B]
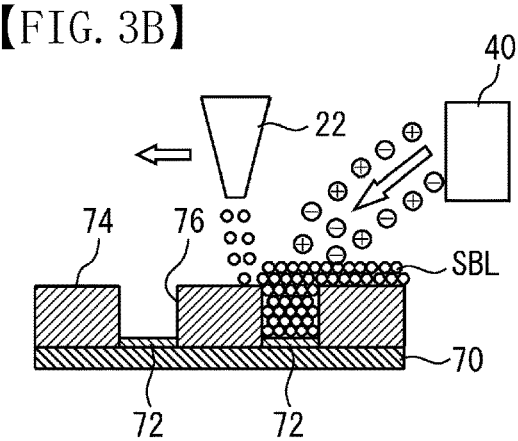
[FIG. 3C]
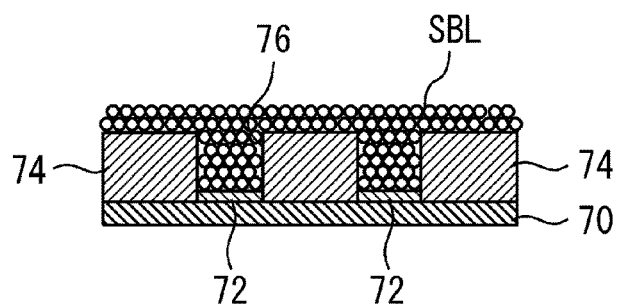
[FIG. 3D]
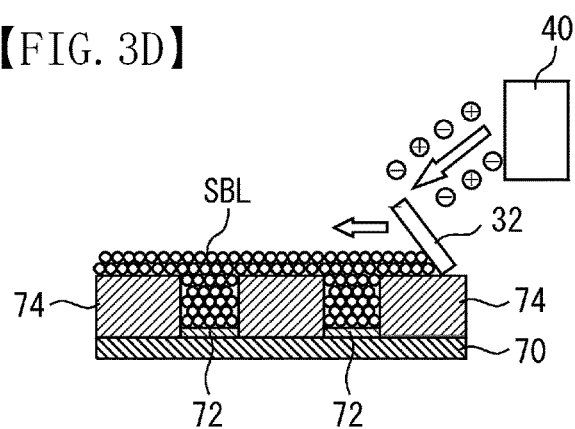

[FIG. 3E]
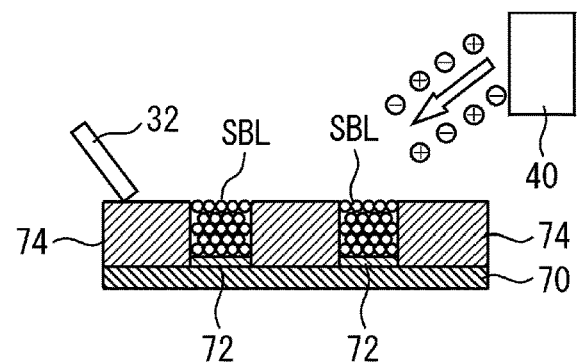
[FIG. 3F]
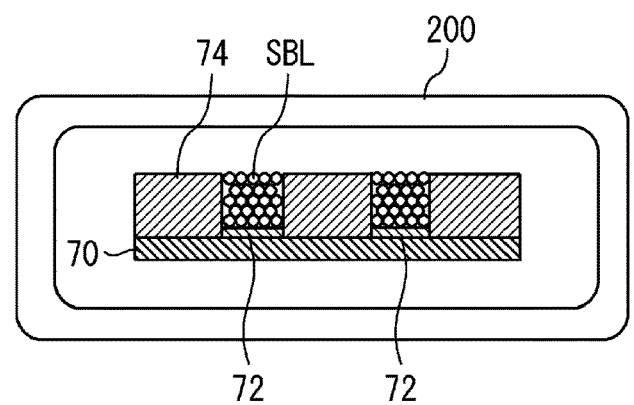
[FIG. 3G]
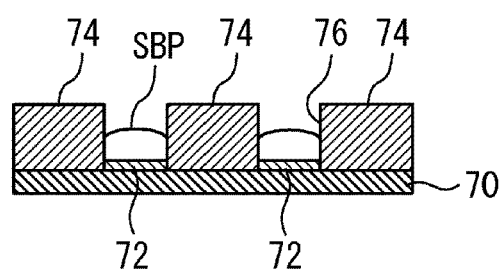
[FIG. 3H]
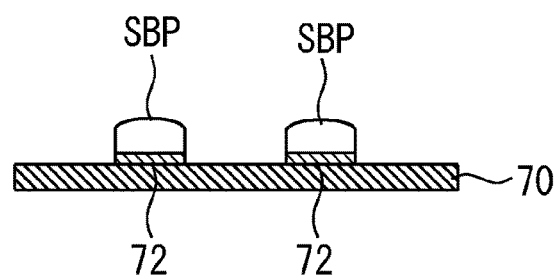

[FIG. 4A]
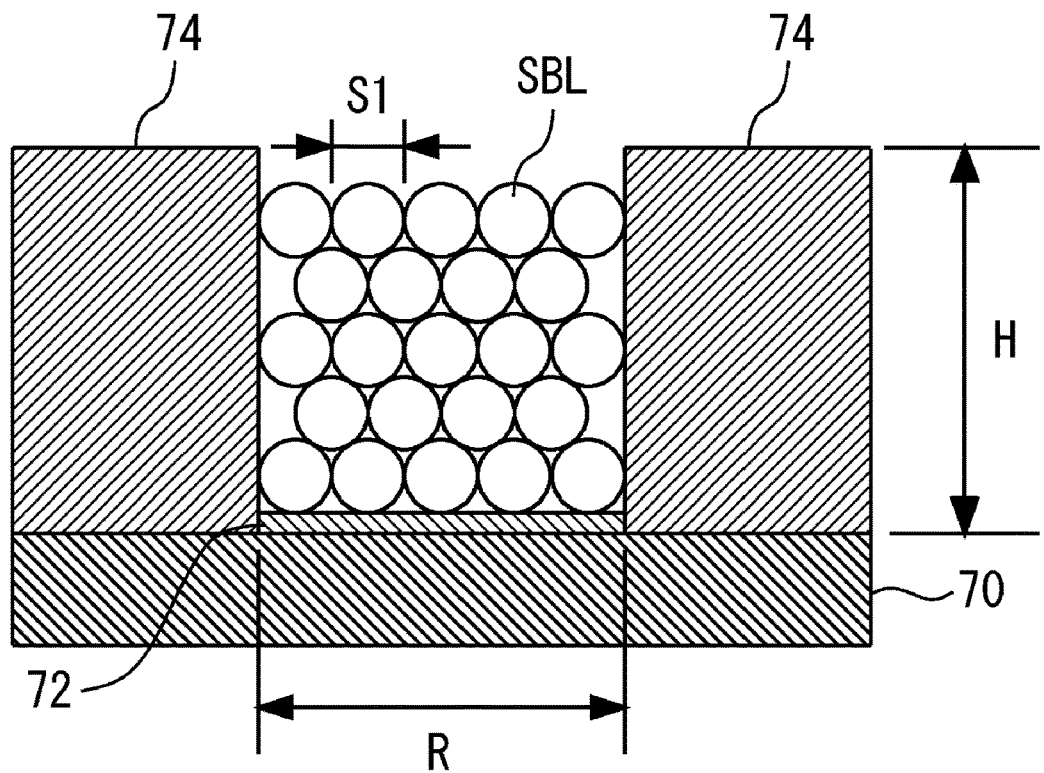
[FIG. 4B]
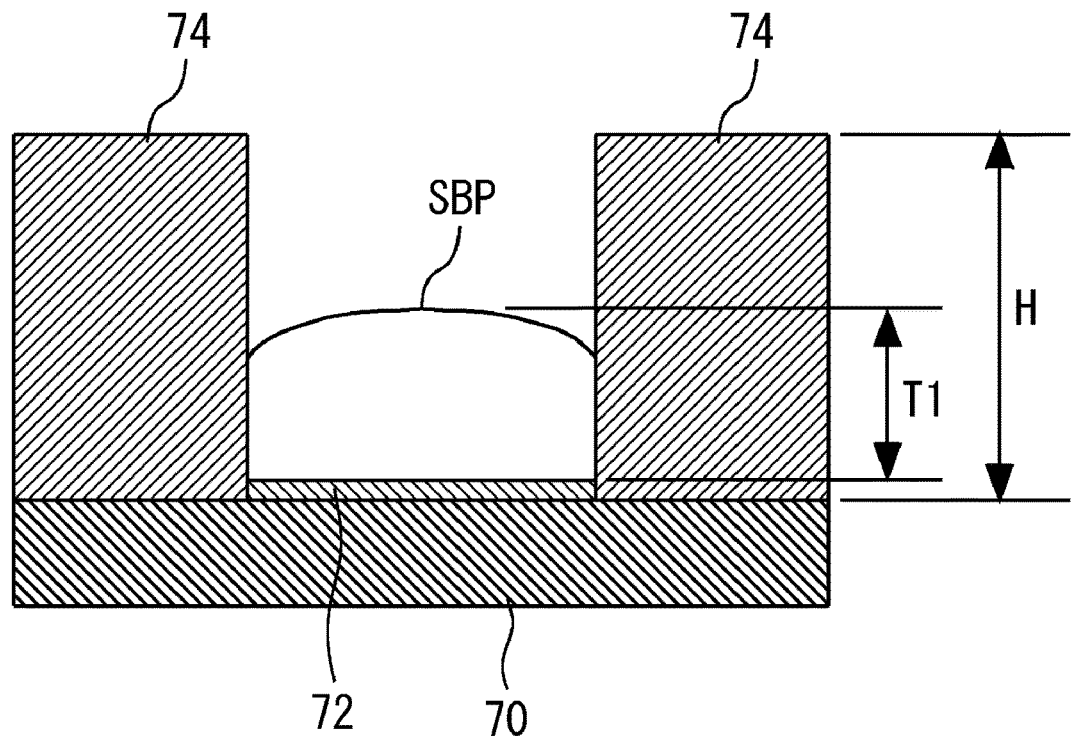

【FIG. 5A】
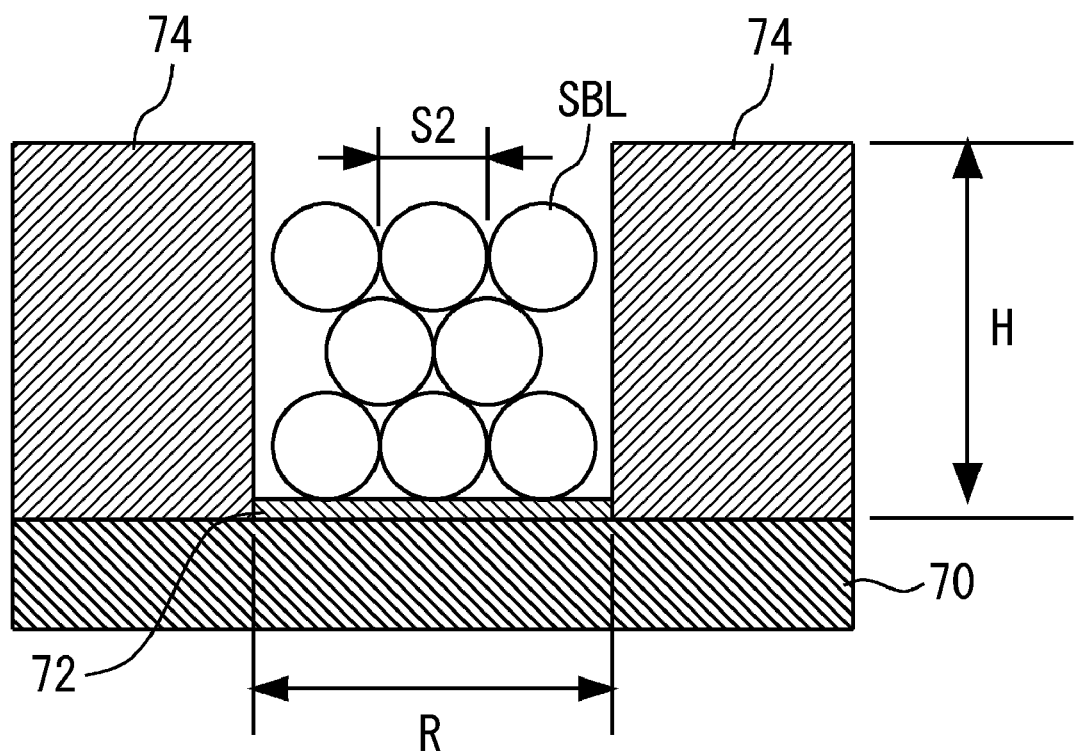
【FIG. 5B】
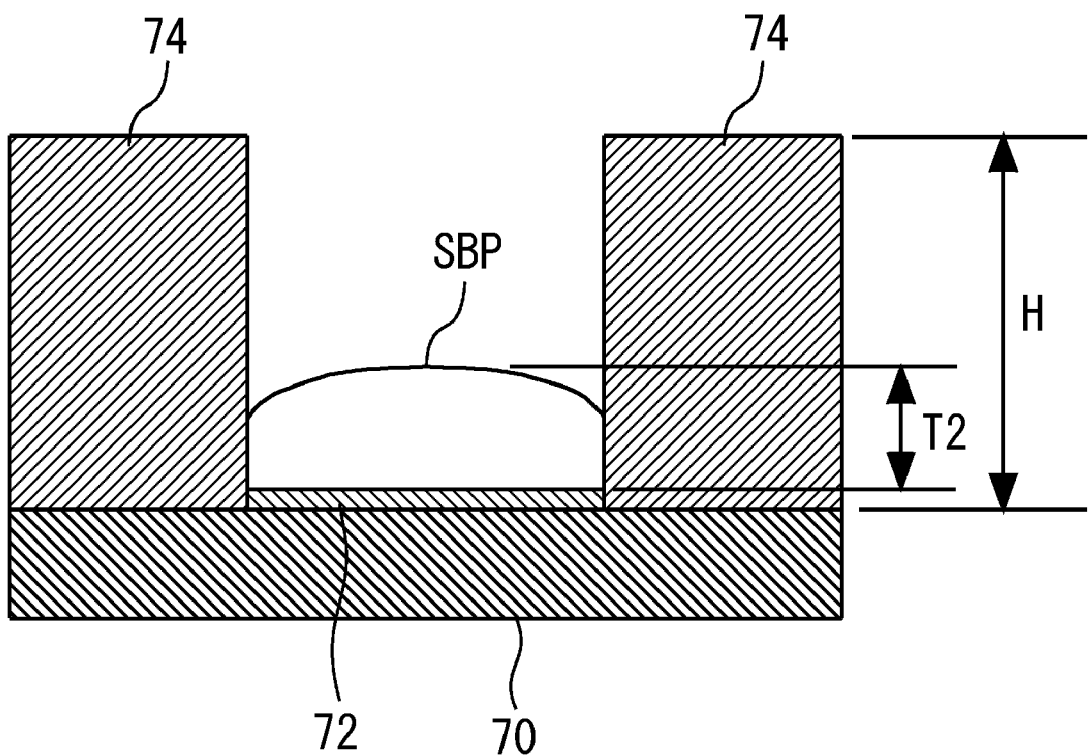

SOLDER BALL SUPPLYING METHOD, SOLDER BALL SUPPLYING DEVICE, AND SOLDER BUMP FORMING METHOD

TECHNICAL FIELD

The present invention relates to a solder-ball-supplying method, a solder-ball-supplying device and a solder-bump-forming method.

BACKGROUND

Accompanying miniaturization of electronic equipment, a pitch between electrodes of an electronic component mounted on the electronic equipment has also become narrow in recent years. For example, the pitch between the electrodes has been 100 μm or less. As methods of forming any solder bumps on the electrodes having such a fine pitch, a plating method, a solder-ball-mounting method (see, for example, Patent Document 1), and a solder-paste-printing method have been known. The solder-paste-printing method has been widely used in general because of an advantage in productive efficiency.

In the solder-paste-printing method, a mask member having openings corresponding to portions of a substrate onto which solder paste comprising solder powder and flux as main components is printed has been first positioned on the substrate. By using a squeegee, the solder paste has been filled in each of the openings of the mask member. The solder bumps have been then formed on the electrodes by heating and fusing the solder paste filled in the openings.

In the above-mentioned solder-paste-printing method, since any flux residue remains on the solder and/or a surface of the substrate after the solder paste is reflowed, a washing step for washing the flux residue and removing it is required. However, in the above-mentioned washing step, a processing by any organic solvent or the like is necessary so that this causes any increased environmental impact. Therefore, a method of forming flux-less solder bump, which does not require to wash any flux residue, is desired.

As the method of forming the flux-less solder bump, Patent Document 2 discloses a method of using only solder powder, filling the solder powder into openings of a mask member mounted on a substrate by movement of a squeegee while irradiating reducing free radical gas under vacuum and then, fusing the solder powder to form a solder bump.

DOCUMENT FOR PRIOR ART

Patent Document

Patent Document 1: Japanese Patent Application Publication No. 2011-249409
Patent Document 2: Japanese Patent No. 4458835

SUMMARY OF THE INVENTION

However, the method of forming the solder bump described in the Patent Document 1 has the following problem. Namely, in a method of filling the solder powder into the openings of the mask member by moving the squeegee along a horizontal direction like the solder-bump-forming method in the Patent Document 1, such a problem that it is generally difficult to fill the solder powder into the openings smoothly and efficiently has been generated.

Accordingly, this invention is made with considering the above-mentioned problem and its object is to provide a solder-ball-supplying method, a solder-ball-supplying device and a solder-bump-forming method, which are flux-less and is capable of being also applied to electrodes having a fine pitch.

Means for Solving the Problems

A solder-ball-supplying method according to this invention is a solder-ball-supplying method of supplying solder balls into an opening of a mask member mounted on a substrate having an electrode, the method comprising a first step of shaking plural solder balls down to the opening, formed on the electrode, from a hopper positioned over the substrate, a grain diameter of each solder ball being 1 through 10 μm, and a second step of moving a squeegee along a plane direction of the mask member to push and fill the shaken-down plural solder balls into the opening.

In this invention, it is preferable that a side or a diameter of the electrode is within a range of 10 through 30 μm.

A solder-ball-supplying device according to this invention is a solder-ball-supplying device that supplies solder balls into an opening of a mask member mounted on a substrate having an electrode, wherein the solder-ball-supplying device is provided with a hopper that is positioned over the substrate and shakes the plural solder balls down to the opening, formed on the electrode, a grain diameter of each solder ball being 1 through 10 μm, and a squeegee that moves along a plane direction of the mask member to push and fill the shaken-down plural solder balls into the opening.

In this invention, it is preferable that a side or a diameter of the electrode is within a range of 10 through 30 μm.

A solder-bump-forming method according to this invention contains a first step of shaking plural solder balls down to an opening of a mask member mounted on a substrate having an electrode, the opening being formed on the electrode, from a hopper positioned over the substrate, a grain diameter of each solder ball being 1 through 10 μm, a second step of moving a squeegee along a plane direction of the mask member to push and fill the shaken-down plural solder balls, and a third step of fusing the plural solder balls filled into the opening using organic acid gas to form a solder bump on the electrode.

In this invention, it is preferable that a side or a diameter of the electrode is within a range of 10 through 30 μm.

Effect of the Invention

According to this invention, since the solder balls are shaken down to the opening from the hopper and then the shaken-down solder balls are filled into the opening using the squeegee, it is possible to supply the solder balls efficiently and smoothly even when a diameter of the electrode is fine.

BRIEF DESCRIPTION OF DRAWINGS

FIG. 1 is a diagram showing a configuration example of an embodiment of a solder-ball-supplying device according to this invention.
FIG. 2 is a diagram showing a configuration example of a solder-shaking-down portion.
FIG. 3A is a diagram showing an example of a solder-bump-forming method.
FIG. 3B is a diagram showing an example of the solder-bump-forming method.
FIG. 3C is a diagram showing an example of the solder-bump-forming method.

FIG. 3D is a diagram showing an example of the solder-bump-forming method.

FIG. 3E is a diagram showing an example of the solder-bump-forming method.

FIG. 3F is a diagram showing an example of the solder-bump-forming method.

FIG. 3G is a diagram showing an example of the solder-bump-forming method.

FIG. 3H is a diagram showing an example of the solder-bump-forming method.

FIG. 4A is a diagram showing a condition when filling the solder balls each having a grain diameter of 2 μm into an opening.

FIG. 4B is a diagram showing a condition of a solder bump formed after the solder balls each having a grain diameter of 2 μm filled into the opening are reflowed.

FIG. 5A is a diagram showing a condition when filling the solder balls each having a grain diameter of 3 μm into an opening.

FIG. 5B is a diagram showing a condition of a solder bump formed after the solder balls each having a grain diameter of 3 μm filled into the opening are reflowed.

MODE FOR IMPLEMENTING THE INVENTION

The following will describe preferable embodiments of this disclosure more in detail with reference to the accompanying drawings. It is to be noted that sizes and/or ratios in the drawings are exaggerated for convenience of explanation and they may be different from the actual ratios.

[Configuration Example of Solder-Ball-Supplying Device]

A configuration example of a solder-ball-supplying device 100 according to this invention will be first described. FIG. 1 shows the configuration example of the solder-ball-supplying device 100. FIG. 2 shows a configuration example of a solder-shaking-down portion 20 constituting the solder-ball-supplying device 100. In FIG. 1, a horizontal direction of paper surface is shown as X direction; a vertical direction of the paper surface is shown as Z direction; and a direction that is orthogonal to the X and Z directions is shown as Y direction.

The solder-ball-supplying device 100 is provided with a controller 50 that controls operations of whole of the device, a base 10, and a case covering a substrate-mounting surface side of the base 10, as shown in FIG. 1. The controller 50 includes a central processing unit (CPU) and a read only memory (ROM), which are not shown, and boots up programs stored in ROM to control each portion, thereby carrying out respective steps of supplying the solder balls and respective steps of forming the solder bump, which will be described later.

A stage 14, the solder-shaking-down portion 20, a solder-filling portion 30 and an ionizer 40 are respectively provided inside the case 12. The stage 14 mounts a substrate 70 on which a resist 74 is positioned. To the stage 14, a vibration apparatus 60 is fitted. The vibration apparatus 60 drives to vibrate the stage 14 under the control of the controller 50 when shaking the solder balls SBL down from a hopper 22 or filling the solder balls SBL by a squeegee 32. The vibration thereof may be performed on a direction of, for example, an X-Y plane. This enables the solder balls SBL to be densely filled in the opening 76. As a result thereof, a filling rate of the solder balls SBL can be increased.

As shown in FIG. 2, the solder-shaking-down portion 20 includes the hopper 22, a mesh 24, an ultrasonic oscillator 26 and a moving mechanism 28 (see FIG. 1). The hopper 22 is a cylinder having a truncated cone shape, which is provided over the substrate 70, while it is fitted to the moving mechanism 28 with its smaller area side facing downward. The moving mechanism 28 is composed of, for example, an X-Y-Z stage, and can move the hopper 22 along X-Y-Z directions by driving of a motor, not shown, under the control of the controller 50.

Plural solder balls SBL are contained inside the hopper 22. As a method of supplying the solder balls SBL into the hopper 22, a predetermined amount of the solder balls SBL can be automatically supplied thereto using a supplier, not shown, or a user can supply the solder balls SBL by hand.

As the solder balls SBL to be used in this embodiment, lead-free solder can be used in which each ball has a grain diameter of, for example, 1 through 10 μm, and, metal composition of which is Sn—Ag—Cu series. Specifically, it is preferable that the lead-free solder of 3.0Ag-0.5Cu-balance of Sn can be used. Further, for the solder balls SBL, other than the above, the lead-free solder of Sn—Zn—Bi series, Sn—Cu series, Sn—Ag—In—Bi series, Sn—Zn—Al series or the like can be used. The lead contained solder of Sn—Pb series or Sn—Pb—Ag series can be used. The solder composition used in this invention is not limited to the above-mentioned composition.

The mesh 24 is fitted to a lower end of the hopper 24 and has any fine gridlike openings. A diameter of the opening is selected so that it is equal to or somewhat greater than the grain diameter of each of the used solder balls SBL. The mesh 24 can be configured to be detachable from the hopper 22. This allows the mesh 24 to be suitably replaced according to the grain diameter of each of the solder balls SBL to be used. A shape of a shaking-out portion 23 at a forward end of the hopper 22 is made circular in this embodiment.

The ultrasonic oscillator 26 is fitted to, for example, a side surface portion of the hopper 22 and vibrates the hopper 22 at a frequency of, for example, 20 through 40 kHz under the control of the controller 50. This allows the plural solder balls SBL contained in the hopper 22 to be evenly and uniformly shaken down to the rest 74. Further, since the diameter of the opening of the mesh 24 is equal to or somewhat greater than a spherical shape of each of the used solder balls SBL, the ultrasonic oscillator 26 can function as a shatter by its ON or OFF operation.

Referred back to FIG. 1, the solder-filling portion 30 includes the squeegee 32, a fixing portion 34 and a moving mechanism 36. The squeegee 32 is made of, for example, urethane and is fitted to the moving mechanism 36 through the fixing portion 34. The moving mechanism 36 is composed of, for example, an X-Y-Z stage, and can move the squeegee 32 along X-Y-Z directions by driving of a motor, not shown, under the control of the controller 50.

The ionizer 40 is set at one end side of the substrate 70 mounted on the stage 14 while its nozzle faces the solder balls SBL shaken down to an upper surface of the resist 74 and the opening 76, and the substrate 70. The ionizer 40 operates under the control of the controller 50 to inject positive and negative ions toward the solder balls SBL and the substrate 70. It may inject the positive ion and the like toward the solder balls SBL before they have shaken down onto the resist 74. Accordingly, by neutralize deviation of electric charges in the solder balls SBL and the substrate 70, it is possible to eliminate static electricity in the solder balls SBL and the substrate 70 so that it is possible to prevent the solder balls SBL from being agglutinated to each other during the filling of the solder balls SBL into the opening 76 and prevent being difficult to fill them into the opening 76. Further, the ionizer 40 may be configured to be able to swing.

[Embodiment of Solder-Bump-Forming Method (Embodiment of Solder-Ball-Supplying Method)]

Next, the following will describe an embodiment of a solder-bump-forming method according to this invention with reference to FIGS. 1 through 3H. FIGS. 3A through 3H show an example of steps of forming the solder bump SBP. Among them, FIGS. 3A through 3E show an example of steps of supplying the solder balls SBL to the openings 76 of the resist 74. It is to be noted that in this embodiment, plural electrodes each having a diameter of 10 through 30 µm are formed on the substrate 70 and a pitch between the electrodes 72, 72 is selected to be 20 through 60 µm.

As shown in FIG. 3A, the substrate 70 on which the resist having openings 76 at its positions corresponding to the electrodes 72 of the substrate 70 is positioned is first prepared. For a patterning of the resist 74, for example, a known photolithography technology can be used. Specifically, the resist 74 is applied onto the substrate 70 and light irradiates to the applied resist 74 via a photomask to transfer the pattern of the openings 76. An exposure portion then removes the resist 74, so that the openings 76 are formed on the electrodes 72 of the resist 74. Although the resist 74 has been explained using its positive type one, negative type one can be used.

It is preferable that thickness of the resist 74 is about twice the thickness of the solder bump SBP to be targeted, which will be described later. This is because when fusing the plural solder balls SBL filled in the opening 76 of the resist 74, their height is about a half of the height of the plural solder balls SBL when filling them. For the resist 74, any materials which have resistance to a temperature in a reflow apparatus 200, which will be described later, and can be peeled off the substrate 70 by a fixed solvent are generally used.

Next, as shown in FIG. 3B, the plural solder balls SBL are shaken down to the openings 76 of the resist 74 from the hopper 22 and they are filled therein. The controller 50 allows the ultrasonic oscillator 26 to drive so that the hopper 22 is vibrated at a frequency of, for example, 20 through 40 kHz to shake the plural solder balls SBL down to the openings 76 through the mesh 24. The controller 50 also allows the moving mechanism 28 to drive so that the hopper 22 is moved along a plane direction (X-Y direction) of the substrate, thereby uniformly shaking the solder balls SBL down to a whole surface of the resist 74. In this moment, the controller 50 allows the ionizer 40 to drive so that electricity can be eliminated from the shaking-down solder balls SBL or the solder balls SBL shaken down onto the resist 74 by injecting the positive and negative ions to them. In this moment, the controller 50 may allow the vibration apparatus 60 to drive so that the stage 14 is vibrated. Further, although the filling step has been performed in atmospheric pressure in this embodiment, it may be performed under vacuum or the like.

Thus, as shown in FIG. 3C, it is possible to fill the plural solder balls SBL into all of the openings 76 evenly and with high density while preventing the solder balls SBL from being agglutinated. In this moment, the plural solder balls SBL are shaken down to an upper surface of the resist 74 other than the openings 76 and are accumulated thereon. It is to be noted that by suitably adjusting the frequency of the ultrasonic oscillator 26, a moving speed of the hopper 22 and an amount of injected ions by the ionizer 40, it is possible to control filling the solder balls SBL in the openings with high precision.

Next, as shown in FIGS. 3D and 3E, by moving or sliding the squeegee 32 along the X-Y direction on the upper surface of the resist 74 with the ionizer 40 being driven, the solder balls SBL shaken down onto the resist 74 other than the openings 76 can be scrapped and removed. Further, by passing the squeegee 32 through above the openings 76, the solder balls SBL in the openings and around them are pushed into the openings 74 by the squeegee 32. This enables density of the solder balls SBL in the openings 76 to be enhanced. Thus, the squeegee 32 also has a function to increase the filling rate of the solder balls SBL to the opening 76 in addition to the function to remove the excessed solder balls SBL. Further, by injecting the positive ion and the like by the ionizer 40, it is possible to prevent the solder balls BL from being agglutinated and to smoothly fill the solder balls SBL to the openings 76 and remove the excessed ones.

Next, when finishing filling the solder balls SBL to the openings 76, the substrate 70 is brought out of the solder-ball-supplying device 100 and the brought-out substrate 70 is then transferred to a reflow apparatus 200, as shown in FIG. 3F. The reflow apparatus 200 heats and fuses the plural solder balls SBL under an atmosphere of mixed gas of organic acid gas and inert gas. Any oxides in the solder balls SBL and the electrodes 72 are removed by reducing power of the organic acid in the reflow apparatus 200. Therefore, any flux which has been required as before is not required. When finishing the fusion of the solder balls SBL in the reflow step, the solder bumps SBP are formed on respective electrodes 72, as shown in FIG. 3G.

As an example of the organic acid gas, for example, any one species of gas obtained by heating and vaporizing formic acid, acetic acid, propionic acid, butyric acid, valerylic acid, caproic acid, enanthic acid, caprylic acid, pelargonic acid, oxalic acid, malonic acid, succinic acid, acrylic acid, salicylic acid, lactic acid, diacetyl, acetylacetone or acetonylacetone or mixed gas of two species or more can be used. As an example of the inert gas, for example, nitrogen, carbon dioxide, helium, argon or the like can be exemplified.

Next, when finishing the reflow step, the substrate 70 is brought out of the reflow apparatus 200 and the resist 74 is peeled off the substrate 70 using any solvents, as shown in FIG. 3H, and it is washed. Thus, the solder bumps SBP can be formed on respective electrodes 72 of the substrate 70.

[Example of Relationship Between Grain Diameter of Solder Ball and Diameter of Electrode or the Like]

Next, the following will describe an example of relationship between the grain diameter S1 of each of the solder balls SBL and the diameter R of the electrode 72 or the like. FIG. 4A is a diagram showing a condition when filling the solder balls SBL each having a grain diameter S1 of 2 µm into the opening 76 and FIG. 4B shows a condition of the solder bump SBP formed after the reflow.

In this embodiment, the diameter R of the electrode 72 was set to be 10 µm, the pitch between the electrodes 72, 72 was set to be 20 µm and thickness of the target solder bump SBP was set to be 5.3 µm. Further, the solder balls SBL were used, each ball having the grain diameter S1 that was one fifth or less of the diameter R of the electrode 72. Specifically, the solder balls SBL were used, each ball having the grain diameter of 2 µm. Further, the height H of the resist 74 was formed so that it was 10 µm which was about twice the thickness (5.3 µm) of the solder bump SBP to be targeted. In these conditions, when filling the solder balls SBL in the opening 76, the filling rate of the plural solder balls SBL to the opening 76 was 43.2%, as shown in FIG. 4A.

When the solder balls SBL filled in the openings 76 were then heated and fused, the thickness T1 of the solder bump SBP became 5.3 μm, which was target value, as shown in FIG. 4B. Thus, by setting the grain diameter S1 of each of the solder balls SBL to be about one fifth or less of the diameter R of the electrode 72 and setting the height H of the resist 74 to be about twice the thickness of the solder bump SBP to be targeted, it was possible to increase the filling rate of the solder balls SBL to the opening 76 and to realize the target thickness of the solder bump SBP.

The following will describe a case where the solder balls SBL are used, each ball having a grain diameter S2 of 3 μm which exceeds one fifth of that of the electrode 72. FIG. 5A is a diagram when filling the solder balls SBL each having the grain diameter S2 of 3 μm into the opening 76 and FIG. 5B is a diagram showing a solder bump SBP formed after the reflow. It is to be noted that other than that, the diameter R of the electrode, the height H of the resist 74, the thickness of the target solder bump SBP are set to be the same conditions as those of the case where the solder balls SBL each having the grain diameter S1 of 2 μm are used.

In these conditions, when filling the solder balls SBL each having the grain diameter S2 of 3 μm in the opening 76, the filling rate of the plural solder balls SBL to the opening 76 was 36.0%, as shown in FIG. 5A.

When the solder balls SBL filled in the opening 76 are then heated and fused, the thickness T2 of the solder bump SBP became 4.58 μm.

As described above, according to this embodiment, since the solder balls SBL are shaken down to the openings 76 from the hopper 22 provided over the substrate 70 and then, the shaken-down solder balls SBL are filled to the openings 76 by the movement of the squeegee 32 along the X-Y direction, it is possible to fill the solder balls SBL to the openings 76 efficiently and smoothly even if the pitch between the electrodes 72 is fine. Further, since in this moment, the solder balls SBL are shaken down to the whole surface of the resist 74 uniformly while the hopper 22 moves along the X-Y direction, it is possible to fill the solder balls SBL to all of the openings 76 evenly.

Further, according to this embodiment, it is possible to easily control a height and/or a width of the solder bump SBP by changing a height and/or a width of the opening 76 of the resist 74.

Additionally, the reflow is carried out using any organic acids when forming the solder bump SBP so that it is possible to realize a flux-less reflow. Since any flux is not used, it is possible to prevent any voids generally generated by the solder paste during the reflow from occurring.

Still further, when forming the solder bump SBP, the resist 74 is provided between the electrodes 72, 72 so that it is also possible to suppress any occurrence of bridge.

Technical scope of this invention is not limited to the above-mentioned embodiments but includes various kinds of changes to the above-mentioned embodiments without deviating from a gist of this invention. Although the resist 74 has been used as a mask member in the above-mentioned embodiments, it is not limited thereto. For example, a metal mask or the like can be used as the mask member. Further, the frequency of the ultrasonic oscillator 26 is not limited to 20 through 40 kHz but any other frequency band may be suitably selected. Additionally, the shape of the hopper 22 is not limited to the truncated cone shape but any shape which can contain plural solder balls SBL could be suitably adapted.

According to this invention, since the solder balls SBL are shaken down to the openings 76 from the hopper 22 and then, the shaken-down solder balls SBL are filled to the openings 76 by the squeegee 32, it is possible to supply the solder balls SBL to the openings 76 efficiently and smoothly even if the diameter of the electrode 72 is fine. Further, according to this invention, even when there are any electrodes 72 having plural species of shapes (a circle, a rectangle, an ellipse and the like) and areas on the same substrate 70, it is possible to supply the solder balls SBL to the openings 76 efficiently and smoothly because the plural solder balls SBL are used. This enables the solder bumps SBP having plural species of shapes to be formed on the same substrate 70.

22 Hopper
32 Squeegee
40 Ionizer
70 Substrate
74 Resist
76 Opening(s)
SBL Solder Ball(s)
SBP Solder Bump(s)

The invention claimed is:

1. A solder-ball-supplying method of supplying a solder ball into an opening of a mask member mounted on a substrate having an electrode, the method comprising:
   a first step of shaking plural solder balls down to the opening, formed on the electrode, from a hopper positioned over the substrate by vibrating the hopper with an ultrasonic transmitter, a grain diameter of each solder ball being 1 through 10 μm;
   a second step of moving a squeegee along a plane direction of the mask member to push and fill the shaken-down plural solder balls into the opening; and
   eliminating static electricity from at least the plural solder balls by injecting ions toward at least the solder balls using an ionizer.

2. The solder-ball-supplying method according to claim 1, wherein a side or a diameter of the electrode is within a range of 10 through 30 μm.

3. The solder-ball-supplying method according to claim 2, wherein in the second step, the plural solder balls shaken-down to the mask member are removed from the mask member using the squeegee.

4. The solder-ball-supplying method according to claim 1, wherein the ionizer injects ions toward at least the plural solder balls (i) while the plural solder balls are being shaken down to the mask member, (ii) after the plural solder balls are on the mask member, or (iii) both while the plural solder balls are being shaken down to the mask member and after the plural solder balls are on the mask member.

5. The solder-ball-supplying method according to claim 1, wherein in the second step, the plural solder balls shaken-down to the mask member are removed from the mask member using the squeegee.

6. A solder-bump-forming method comprising:
   a first step of shaking plural solder balls down to an opening of a mask member mounted on a substrate having an electrode, the opening being formed on the electrode, from a hopper positioned over the substrate by vibrating the hopper with an ultrasonic transmitter, a grain diameter of each solder ball being 1 through 10 μm;
   a second step of moving a squeegee along a plane direction of the mask member to push and fill the shaken-down plural solder balls into the opening;

a third step of fusing the plural solder balls filled into the opening using organic acid gas to form a solder bump on the electrode; and eliminating static electricity from at least the plural solder balls by injecting ions toward at least the solder balls using an ionizer.

7. The solder-bump-forming method according to claim 6 wherein a side or a diameter of the electrode is within a range of 10 μm through 30 μm.

8. The solder-bump-forming method according to claim 6, wherein the ionizer injects ions toward at least the plural solder balls (i) while the plural solder balls are being shaken down to the mask member, (ii) after the plural solder balls are on the mask member, or (iii) both while the plural solder balls are being shaken down to the mask member and after the plural solder balls are on the mask member.

9. The solder-bump-forming method according to claim 6 further comprising a fourth step of removing the mask member provided on the substrate after the third step is finished.

* * * * *